(12) United States Patent
Dwyer et al.

(10) Patent No.: US 8,307,710 B2
(45) Date of Patent: Nov. 13, 2012

(54) TRANSLATIONAL MASS IN-PLANE MEMS ACCELEROMETER

(75) Inventors: Paul W. Dwyer, Seattle, WA (US); John Strehlow, Mukilteo, WA (US)

(73) Assignee: Honeywell International Inc., Morristown, NJ (US)

( * ) Notice: Subject to any disclaimer, the term of this patent is extended or adjusted under 35 U.S.C. 154(b) by 597 days.

(21) Appl. No.: 12/500,487

(22) Filed: Jul. 9, 2009

(65) Prior Publication Data

US 2011/0005317 A1    Jan. 13, 2011

(51) Int. Cl.
*G01P 3/00* (2006.01)

(52) U.S. Cl. .................. 73/514.39; 73/514.16

(58) Field of Classification Search ............... 73/514.29, 73/514.01, 514.16, 514.17, 514.23, 514.31, 73/514.32, 514.39
See application file for complete search history.

(56) References Cited

U.S. PATENT DOCUMENTS

| | | | |
|---|---|---|---|
| 3,702,073 A * | 11/1972 | Jacobs | 73/514.32 |
| 4,037,704 A * | 7/1977 | Golobay et al. | 400/124.17 |
| 4,498,342 A * | 2/1985 | Aske | 73/514.23 |
| 4,515,013 A * | 5/1985 | Hue | 73/170.01 |
| 4,665,748 A * | 5/1987 | Peters | 73/504.12 |
| 4,750,364 A * | 6/1988 | Kawamura et al. | 73/510 |
| 4,799,385 A * | 1/1989 | Hulsing et al. | 73/504.12 |
| 4,862,049 A | 8/1989 | Fulton | |
| 4,912,990 A | 4/1990 | Norling | |
| 4,941,354 A * | 7/1990 | Russell et al. | 73/514.24 |
| 5,005,413 A * | 4/1991 | Novack et al. | 73/514.29 |
| 5,006,487 A | 4/1991 | Stokes | |
| 5,060,039 A | 10/1991 | Weinberg et al. | |
| 5,092,173 A | 3/1992 | Aske | |
| 5,115,291 A | 5/1992 | Stokes | |
| 5,205,171 A | 4/1993 | O'Brien et al. | |
| 5,241,861 A * | 9/1993 | Hulsing, II | 73/514.02 |
| 5,319,976 A * | 6/1994 | Hulsing, II | 73/504.12 |
| 5,331,853 A * | 7/1994 | Hulsing, II | 73/514.29 |
| 5,341,682 A * | 8/1994 | Hulsing, II | 73/504.04 |
| 5,369,057 A | 11/1994 | Lee et al. | |
| 5,377,545 A | 1/1995 | Norling et al. | |
| 5,456,110 A * | 10/1995 | Hulsing, II | 73/514.36 |
| 5,563,343 A | 10/1996 | Shaw et al. | |
| 5,596,144 A | 1/1997 | Swanson | |
| 5,627,314 A | 5/1997 | Hulsing, II | |
| 5,682,069 A | 10/1997 | Phillips et al. | |

(Continued)

FOREIGN PATENT DOCUMENTS

EP    1359391 A2    11/2003

(Continued)

*Primary Examiner* — Peter Macciarolo
*Assistant Examiner* — Samir M Shah
(74) *Attorney, Agent, or Firm* — Lowe Graham Jones PLLC (57) ABSTRACT

An in-plane Micro Electro-Mechanical Systems (MEMS) accelerometer device with improved performance. An example MEMS device includes one or more components for generating a magnetic flux field perpendicular to a major plane. The device also includes a substrate, a proof mass, a hinge element that flexibly connects the proof mass to the substrate, the major plane corresponds to a major surface of the proof mass, a plurality of conductive leads located at a position on the proof mass proximate the magnetic flux field, a plurality of conductive springs, each of the springs are electrically connected to a corresponding one of the conductive leads, and a plurality of anchor pads connected to the substrate and one of the conductive springs. Isolation trenches directly connect to outer edges of the leads that are adjacent to other leads or proof mass material. The leads and springs include a plurality of slots.

7 Claims, 9 Drawing Sheets

U.S. PATENT DOCUMENTS

| | | | |
|---|---|---|---|
| 5,698,785 A | 12/1997 | Rich et al. | |
| 5,756,896 A | 5/1998 | Schendel | |
| 5,780,742 A | 7/1998 | Burns et al. | |
| 5,948,982 A | 9/1999 | Woodruff et al. | |
| 5,996,411 A | 12/1999 | Leonardson et al. | |
| 6,035,714 A | 3/2000 | Yazdi et al. | |
| 6,062,081 A | 5/2000 | Schendel | |
| 6,105,427 A | 8/2000 | Stewart et al. | |
| 6,119,520 A | 9/2000 | Woodruff | |
| 6,167,757 B1 | 1/2001 | Yazdi et al. | |
| 6,230,566 B1 | 5/2001 | Lee et al. | |
| 6,276,203 B1 * | 8/2001 | Hulsing, II | 73/504.03 |
| 6,286,369 B1 | 9/2001 | Yazdi et al. | |
| 6,294,400 B1 | 9/2001 | Stewart et al. | |
| 6,295,870 B1 * | 10/2001 | Hulsing, II | 73/514.37 |
| 6,388,789 B1 | 5/2002 | Bernstein | |
| 6,463,802 B2 * | 10/2002 | Hulsing, II | 73/504.04 |
| 6,467,348 B1 * | 10/2002 | Song et al. | 73/504.12 |
| 6,526,827 B2 | 3/2003 | Ueyanagi et al. | |
| 6,575,029 B1 | 6/2003 | O'Keefe et al. | |
| 6,631,643 B2 | 10/2003 | Malvern et al. | |
| 6,636,819 B1 * | 10/2003 | Abbott et al. | 702/96 |
| 6,760,145 B1 | 7/2004 | Taylor et al. | |
| 6,843,126 B2 * | 1/2005 | Hulsing, II | 73/504.04 |
| 6,894,823 B2 | 5/2005 | Taylor et al. | |
| 6,928,873 B2 | 8/2005 | Chen et al. | |
| 6,938,484 B2 | 9/2005 | Najafi et al. | |
| 7,015,780 B2 | 3/2006 | Bernstein et al. | |
| 7,036,374 B2 | 5/2006 | Pike et al. | |
| 7,038,829 B2 | 5/2006 | Bernstein | |
| 7,069,784 B1 | 7/2006 | Eskridge | |
| 7,104,130 B2 | 9/2006 | Kenny et al. | |
| 7,191,654 B2 | 3/2007 | Dwyer et al. | |
| 7,243,542 B2 | 7/2007 | Hulsing, II | |
| 7,331,229 B2 * | 2/2008 | Campbell et al. | 73/514.32 |
| 7,368,312 B1 | 5/2008 | Kranz et al. | |
| 8,065,915 B2 * | 11/2011 | Dwyer | 73/514.31 |
| 2001/0042405 A1 * | 11/2001 | Hulsing, II | 73/514.02 |
| 2003/0005767 A1 * | 1/2003 | Hulsing, II | 73/514.02 |
| 2007/0193355 A1 | 8/2007 | Axelrod et al. | |
| 2007/0214891 A1 | 9/2007 | Robert et al. | |
| 2008/0000297 A1 | 1/2008 | Koury et al. | |
| 2008/0096301 A1 | 4/2008 | Ramamoorthi et al. | |
| 2008/0270060 A1 * | 10/2008 | Dunne | 702/104 |
| 2009/0025477 A1 | 1/2009 | Pilchowski et al. | |
| 2009/0205424 A1 | 8/2009 | Roehnelt et al. | |
| 2010/0020636 A1 * | 1/2010 | Kamata et al. | 367/13 |
| 2010/0083760 A1 * | 4/2010 | Dwyer | 73/514.31 |
| 2010/0083761 A1 * | 4/2010 | Dwyer et al. | 73/514.31 |
| 2010/0170341 A1 * | 7/2010 | Dwyer et al. | 73/514.31 |
| 2010/0180681 A1 * | 7/2010 | Dwyer | 73/514.17 |

FOREIGN PATENT DOCUMENTS

| | | |
|---|---|---|
| WO | 0036374 A1 | 6/2000 |

* cited by examiner

TRANSLATIONAL MASS IN-PLANE MEMS ACCELEROMETER

BACKGROUND OF THE INVENTION

Many accelerometers can be constructed on a single silicon-on-insulator (SOI) wafer leading to cost advantages over single-part-at-a-time construction methodologies. However, if a particular accelerometer includes a coil applied to one side of a proof mass, then there is an issue of cost effectively constructing that device. Performance issues may arise because a trace that ends on an inside of a coil must loop over the coil in order to exit the proof mass. Also, devices formed in this manner may be susceptible to external magnetic fields, generate significant external flux leakage and may fail to meet flux requirements in order to servo the proof mass.

SUMMARY OF THE INVENTION

The present invention provides an in-plane Micro Electro-Mechanical Systems (MEMS) accelerometer device with improved performance. An example MEMS device includes one or more components for generating a magnetic flux field. The magnetic flux field being perpendicular to a major plane. The device also includes a substrate, a proof mass, a hinge element that flexibly connects the proof mass to the substrate for allowing motion of the proof mass in the major plane, the major plane corresponds to a major surface of the proof mass, a plurality of conductive leads located at a position on the proof mass proximate the magnetic flux field, a plurality of conductive springs, each of the springs being electrically connected to a corresponding one of the conductive leads, and a plurality of anchor pads connected to the substrate and one of the conductive springs.

The device also includes one or more sense combs having first tines located on the proof mass and opposing second tines attached to the substrate.

The device also includes damping combs having first tines located on the proof mass and opposing second tines attached to the substrate. The first damping comb tines are electrically isolated from the first sense comb tines.

In one aspect of the invention, each of the conductive springs includes two first legs having a first cross-sectional dimension, an elbow, and two second legs having a second cross-sectional dimension. The two second legs are connected between the elbow and one of the first legs and the second cross-sectional dimension is smaller than the first cross-sectional dimension.

In another aspect of the invention, isolation trenches directly connect to outer edges of the leads that are adjacent to other leads or proof mass material.

In still other aspects of the invention, the leads and springs include a plurality of slots.

BRIEF DESCRIPTION OF THE DRAWINGS

Preferred and alternative embodiments of the present invention are described in detail below with reference to the following drawings:

FIG. 2-1 illustrates a top view of a device layer in an example MEMS accelerometer formed in accordance with an embodiment of the present invention;

FIG. 2-2 is a blow-up view of a portion of the MEMS accelerometer shown in FIG. 2-1;

FIG. 5-1 illustrates a cross-sectional view of one of the spring/conductor elements shown in FIG. 3;

FIG. 5-2 illustrates a cross-sectional view of conductor leads located on a proof mass of the example MEMS accelerometer shown in FIG. 2-1;

FIGS. 7-1 through 7-9 are cross-sectional views illustrating an example process for creating the devices shown in FIGS. 1 and 2-1.

DETAILED DESCRIPTION OF THE INVENTION

Figure 1:
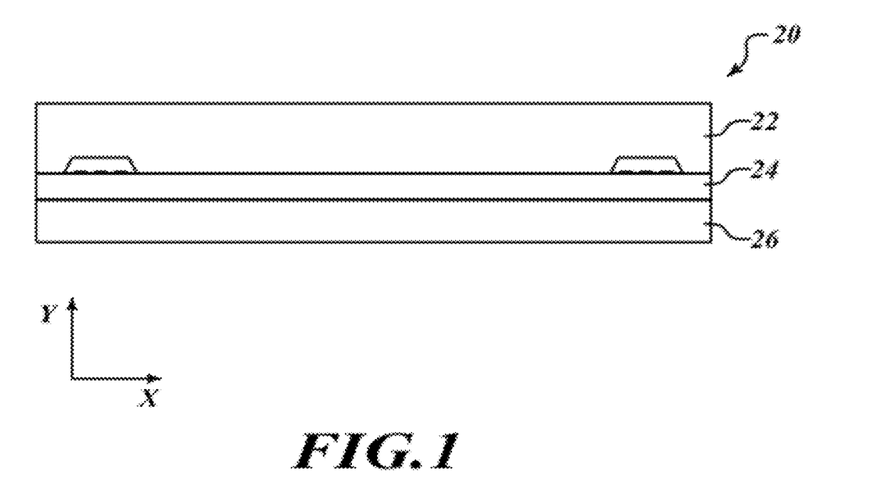
FIG. 1 illustrates a cross-sectional view of translational mass in-plane Micro Electro-Mechanical Systems (MEMS) accelerometer formed in accordance with an embodiment of the present invention.

FIG. 1 illustrates an x-ray view of a translational mass in-plane Micro Electro-Mechanical Systems (MEMS) accelerometer 20 formed in accordance with an embodiment of the present invention. The accelerometer 20 includes a device layer 24 that is attached to a magnet layer 22 and a magnetic return path layer 26. As will be described in more detail below, the device layer 24 includes a proof mass that reacts to motion of the accelerometer 20 along the X axis. In closed loop operation, a current is applied to coils located on the proof mass in order to cause a servoing force to be applied to the proof mass due to magnetic field flux running between the magnet layer 22 and the magnetic return path layer 26 at the location of the electrical traces on the proof mass. The current applied to the traces on the proof mass is based on a capacitance sensed by capacitive components located between the proof mass and one of the layers 22 and 26.

Figure 21:
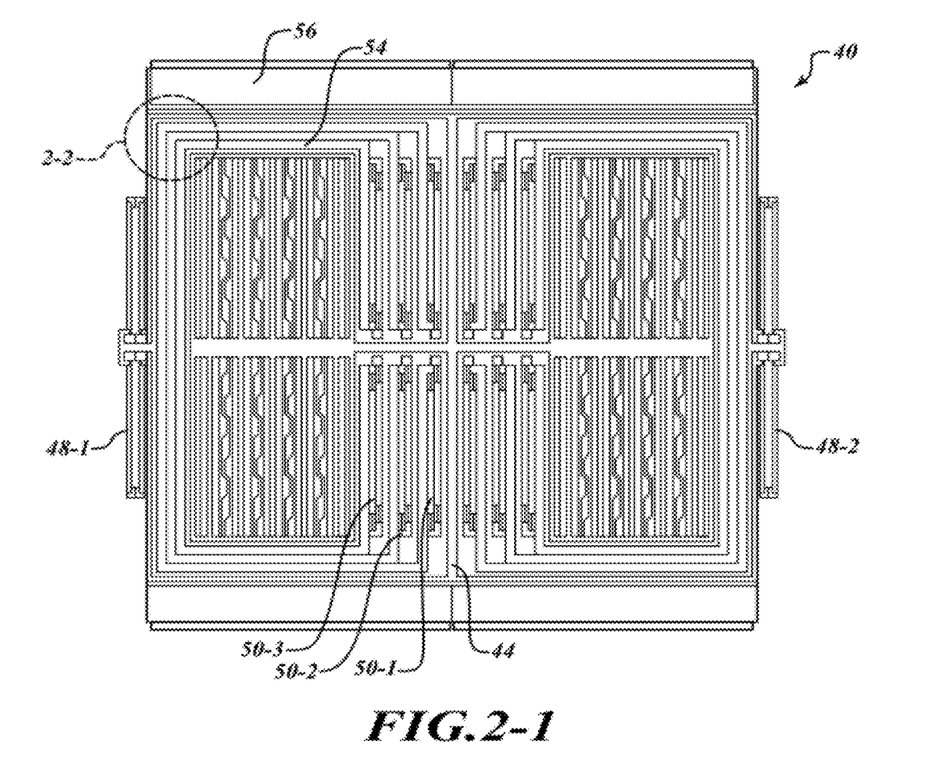
Figure 22:
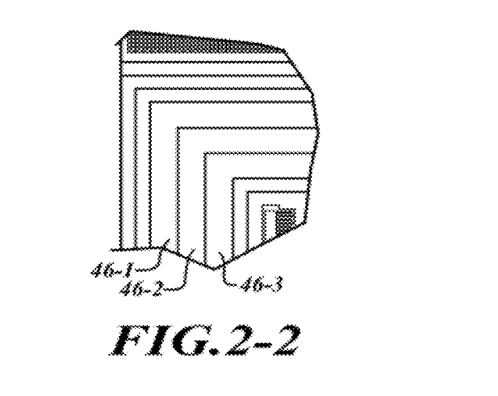

FIG. 2-1 illustrates a top view of a device layer 40 for an example translational mass in-plane MEMS accelerometer. The device layer 40 includes a proof mass 44 that is connected to a substrate (not shown) by outer support springs 48-1 and 48-2. The springs 48-1 and 48-2 allow the proof mass 44 to move in the plane of the device layer 40. On one or both surfaces of the proof mass 44 are a plurality of conductive traces 46-1, 46-2 and 46-3. The conductive traces 46-1, 46-2 and 46-3 are electrically connected to respective inner support springs/conductors 50-1, 50-2 and 50-3. Mounted on outer edges of the proof mass 44 are damping combs 56 that include tines attached to the proof mass 44 and opposing tines attached to the substrate. The damping combs 56 may be used for electrostatic spring softening. Pick-off combs 54 are mounted on the proof mass 44 within areas surrounded by the electrical traces 46-1, 46-2 and 46-3 and the springs/conductors 50-1, 50-2 and 50-3.

The damping comb tines attached to the proof mass 44 are electrically isolated from the pick-off comb tines located on the proof mass 44. The damping comb tines attached to the proof mass 44 are electrically connected to a lead on one of the outer spring elements 48 and the pick-off comb tines attached to the proof mass 44 are electrically connected to the other outer support spring 48.

Figure 3:
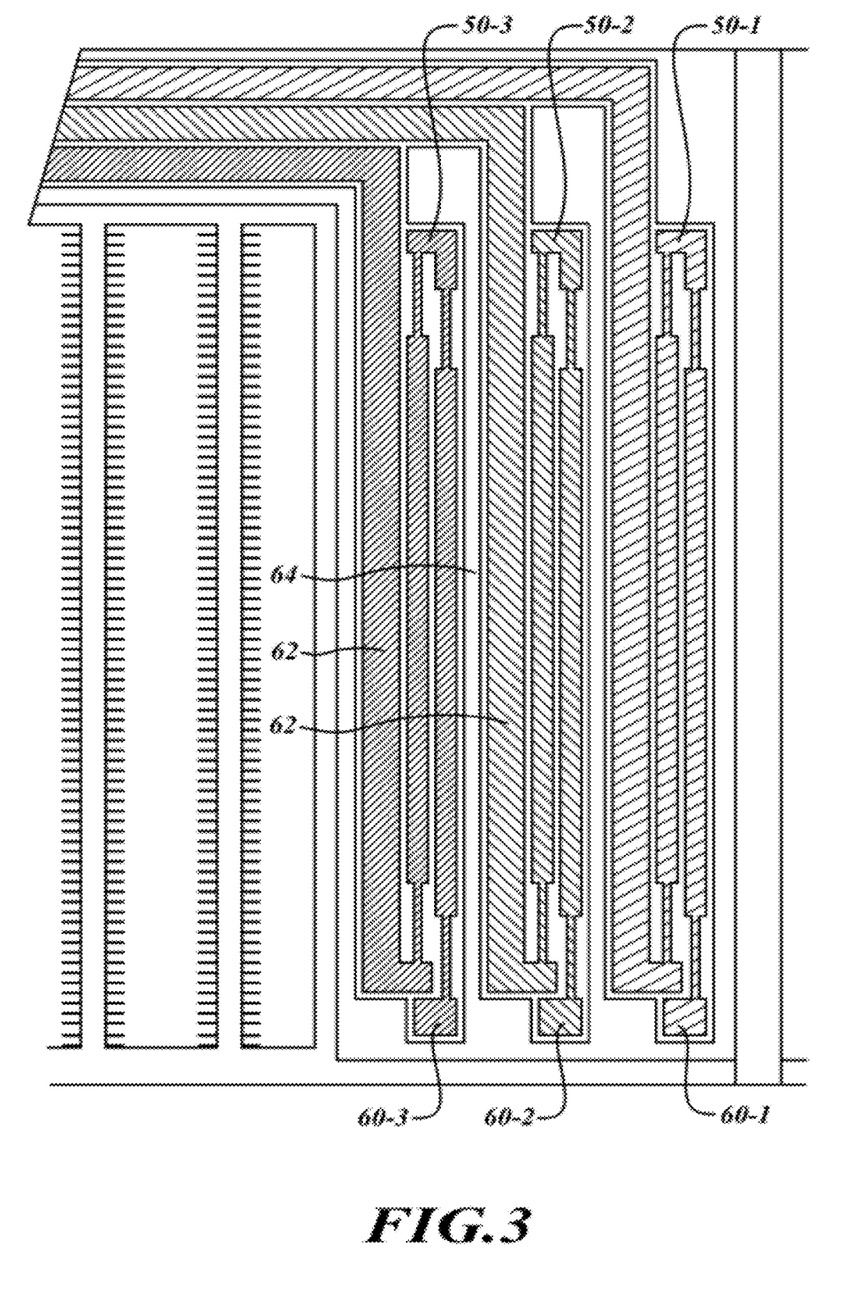
FIG. 3 illustrates a blow-up view of spring/conductor leads of the example MEMS accelerometer shown in FIG. 2-1.

As shown in FIG. 3, each of the inner support springs/conductors 50-1, 50-2 and 50-3 are physically and electrically attached to the respective electrical trace 46-1, 46-2 and 46-3 and a respective anchor pad 60-1, 60-2 and 60-3. The inner support springs/conductors 50-1, 50-2 and 50-3 include thinner cross-sectional areas interspersed with thicker cross-sectional lengths, respective anchor pads 60-1, 60-2 and 60-3, a corner element and ends of the electrical traces 46-1, 46-2 and 46-3. The thinner cross-sectional links minimize any stress applied to the springs/conductors 50-1, 50-2 and 50-3. Only the anchor pads 60-1, 60-2 and 60-3 are attached to the substrate.

The space 64 between the lengths of a particular one of the springs/conductors and an exterior edge of the particular spring/conductor is open all the way through the device layer 40. An insulator barrier 62 is located between each of the electrical traces 46-1, 46-2 and 46-3 and either adjacent electrical traces or proof mass material.

Figure 4:
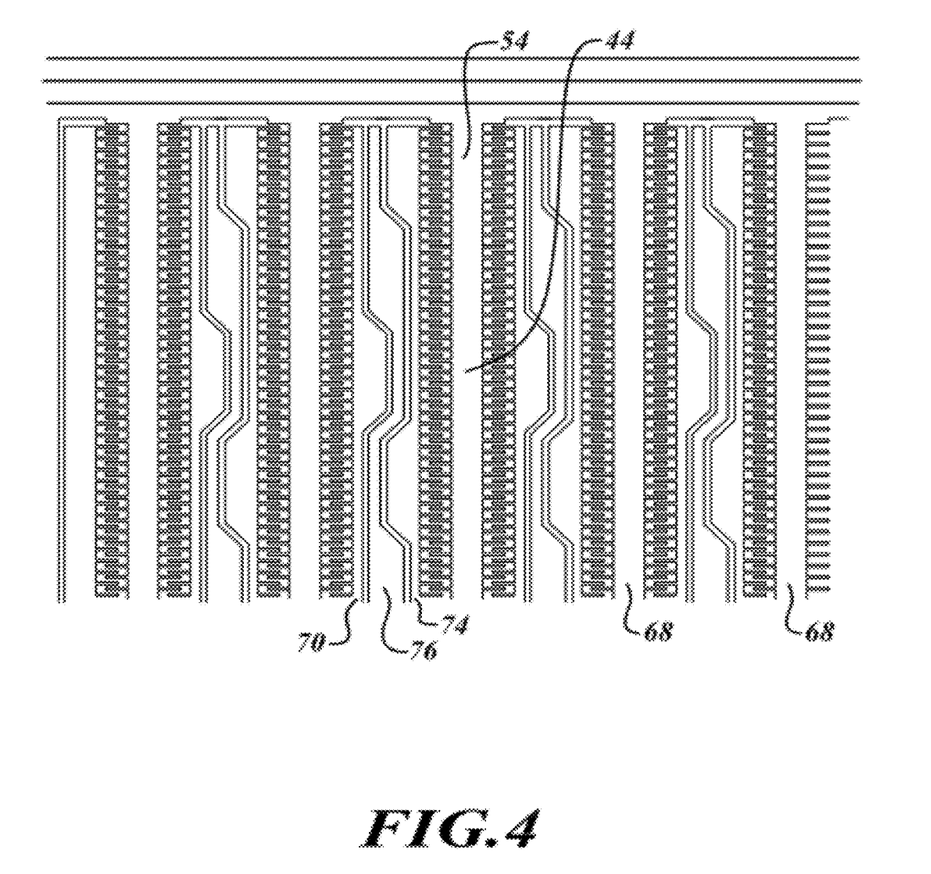
FIG. 4 illustrates a partial view of capacitive pick-off components for the MEMS accelerometer shown in FIG. 2-1.

FIG. 4 illustrates a partial top view of a portion of the pick-off combs 54 of the accelerometer shown in FIG. 2-1. The pick-off combs 54 include a plurality of tines 68 that are mounted to the proof mass 44. Other sets of tines 70, 74 are attached to the substrate and are interleaved with the proof mass tines 68. In an optional configuration, a ground plane 76 is attached to the substrate between opposing stationary tines 70, 74. The ground plane 76 is intended to reduce parasitic capacitances.

Figure 51:
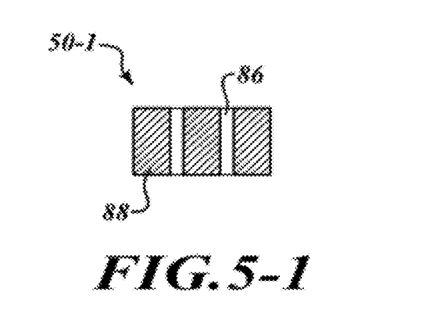

FIG. 5-1 illustrates a cross-sectional view of one of the lengths of the spring/conductor 50-1. The spring/conductor 50-1 includes solid areas of doped silicon 88. The areas include a plurality of etched slots 86. The slots 86 are used to help increase the electrical doping of the spring/conductor 50-1. This configuration is repeated in the other spring/conductors 50-2 and 50-3.

Figure 6:
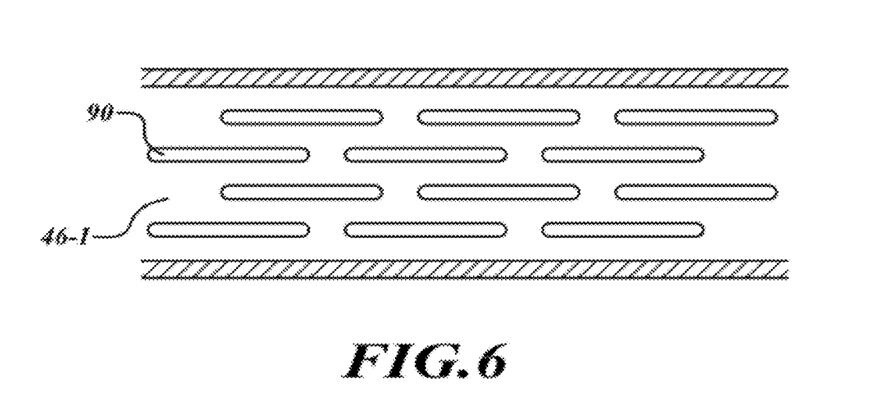
FIG. 6 illustrates a partial top view of example conductor leads used in the devices shown in FIGS. 1 and 2-1.
Figure 52:
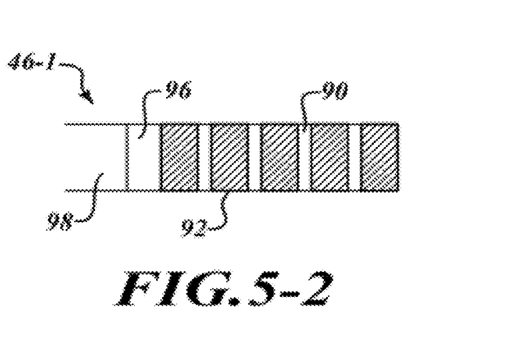
Figure 71:
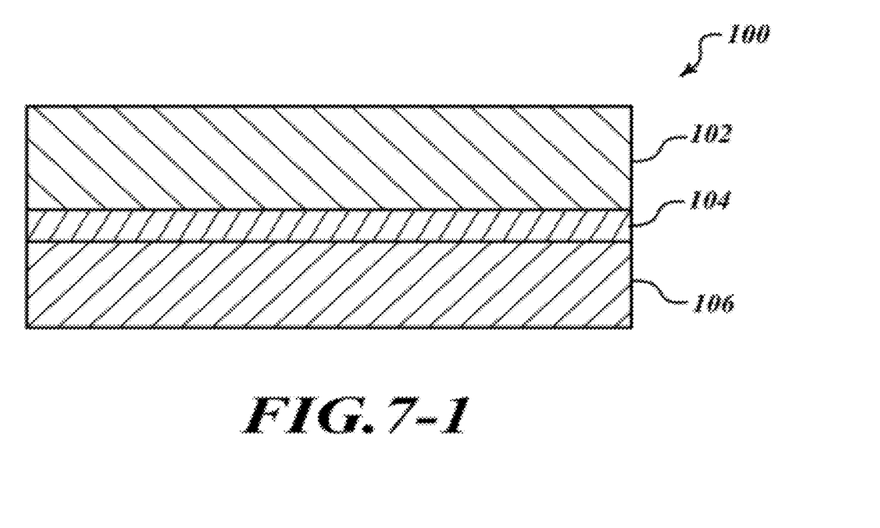
Figure 72:
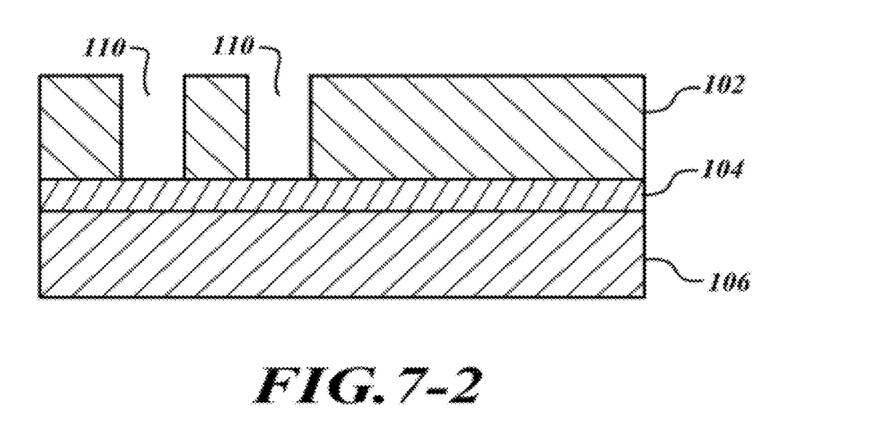

FIG. 5-2 illustrates a cross-sectional view of the electrical trace 46-1. The electrical trace 46-1 includes an area of highly doped silicon 92. The area of silicon 92 includes a plurality of etched slots 90. Adjacent to the electrical trace 46-1 is In-fill 96. The In-fill 86 is located between electrical traces 46-1, 46-2 and 46-3 and is also located between the traces 46-1, 46-2 and 46-3 and a section dielectric 98 that provides electrical isolation from the sense combs or the damping combs. In-fill is a dielectric material grown between the conductive traces 46-1, 46-2 and 46-3 to produce electrically isolated coil turns and restore device stiffness. One implementation of the In-fill includes a combination of oxide and nitride such that the compressive and tensile stresses created net out to zero to minimize warpage. FIG. 6 shows a top view of the slots 90.

FIGS. 7-1 through 7-9 are cross-sectional views of steps in an example process for forming a device such as is shown in FIG. 2-1. First, at FIG. 7-1, a silicon-on-insulator (SOI) wafer 100 having a silicon device layer 102 and a handle (e.g. silicon) layer 106 separated by an insulator layer 104, such as silicon oxide. Next, as shown in FIG. 7-2 isolation trenches and slots 110 are etched into the device layer 102. Deep reactive ion etching (DRIE) is used to create the trenches and slots 110. The trenches are comparable to the isolation barrier 62 shown in FIG. 3. Slots are comparable to the slots 90 shown in FIGS. 5-2 and 6.

Figure 73:
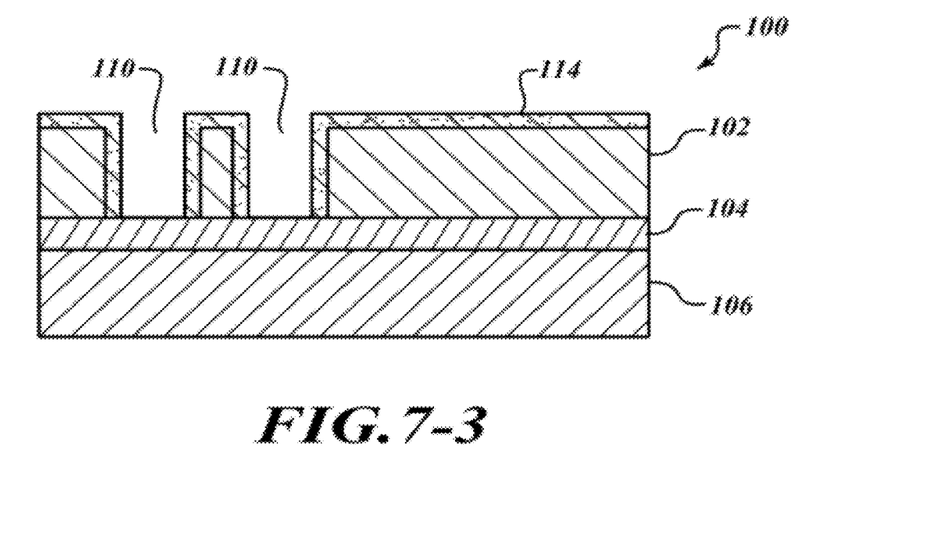

Next, at FIG. 7-3, the exposed surfaces of the device layer 102 are doped in order to increase the electrical conductivity of exposed surfaces 114 of the device layer 102. An example dopant is boron.

Figure 74:
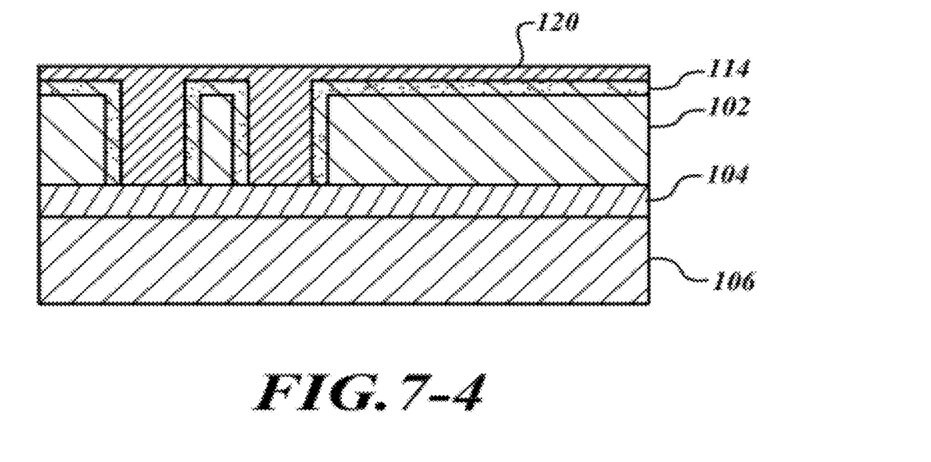

Next, at FIG. 7-4, In-fill is applied to the wafer 100. In one example, the In-fill is oxide\nitride. The In-fill occupies the trenches and slots 110 and produces a layer on the top horizontal surface of the device layer 102.

Figure 75:
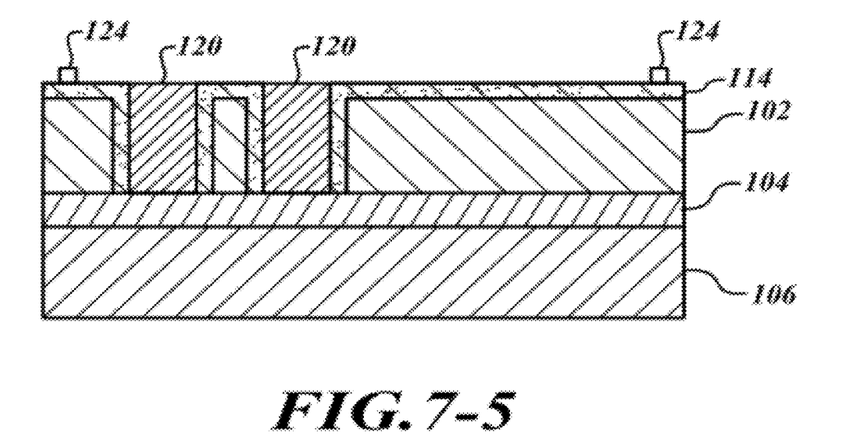

Next, as shown in FIG. 7-5, the wafer 100 is planarized to remove the In-fill that is located on the exterior horizontal surface of the device layer 102, thereby leaving In-fill 120 in the previously open trenches and slots 110. Next, contact bumps 124 are applied to the now exposed surface of the device layer 102. Application of the bumps 124 is performed using a masking and metallization process.

Figure 76:
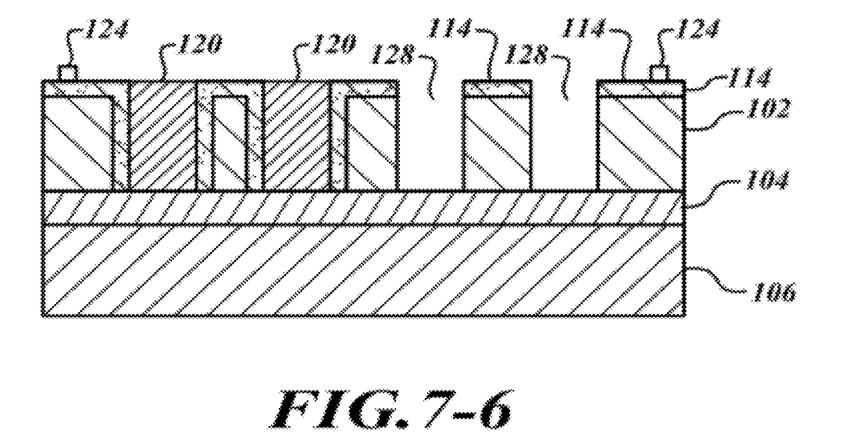
Figure 77:
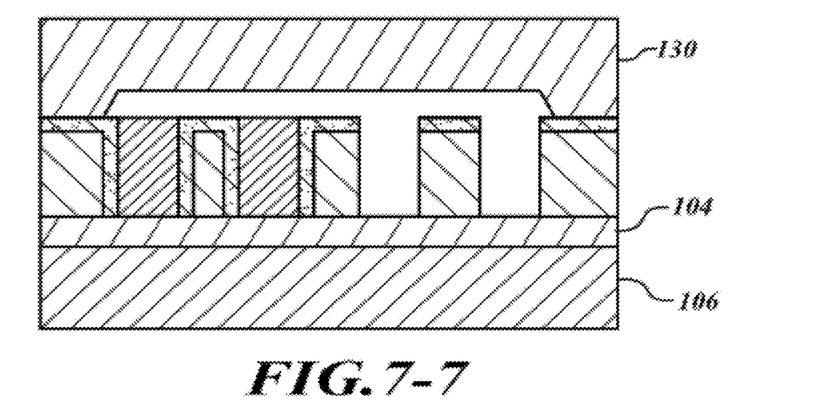
Figure 78:
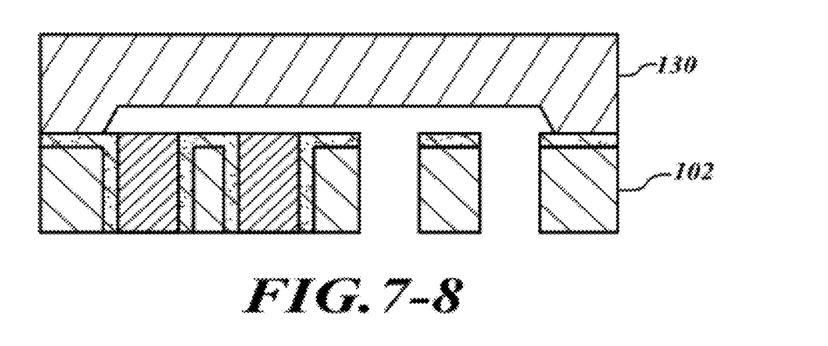
Figure 79:
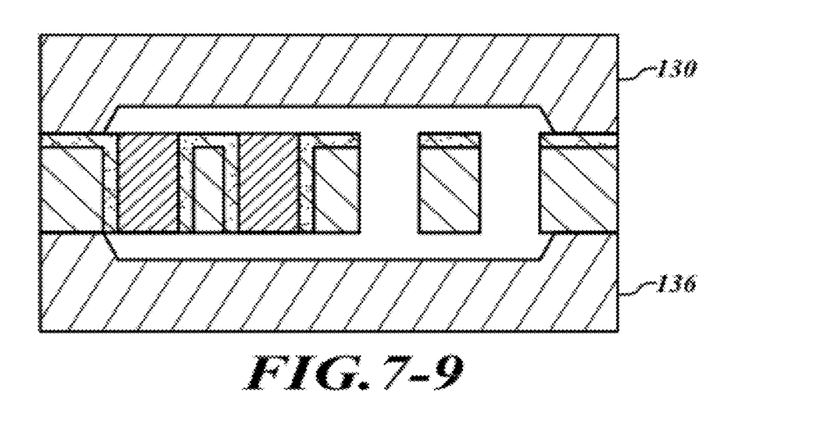

Next at FIG. 7-6, a second DRIE process is performed in order to etch slots 128 for defining the proof mass, springs, damping combs and pick-off combs.

As shown in FIG. 7-7, a magnetic component 130, comparable to the magnetic cover 22 shown in FIG. 1, is anodically bonded to the device layer 102 via the borosilicate glass component of the return path. This simultaneously serves to complete electrical connections via metallization bumps 124. At FIG. 7-8 both the handle layer 106 and the oxide layer 104 are removed. Then, at FIG. 7-9, a magnetic return path 136, similar to the magnet return path 26 shown in FIG. 1 is anodically bonded to an opposing surface of the device layer 102. After this step, the wafer is ready for dicing for separation into individual components ready for mounting onto a circuit board or some other device.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An in-plane Micro Electro-Mechanical Systems (MEMS) accelerometer device having one or more components for generating a magnetic flux field, the magnetic flux field being perpendicular to a major plane, the device comprising:
   a substrate;
   a proof mass;
   a hinge element configured to flexibly connect the proof mass to the substrate for allowing motion of the proof mass in the major plane, the major plane corresponding to a major surface of the proof mass;
   a plurality of conductive leads located at a position on the proof mass proximate the magnetic flux field, thereby producing a servo force to the proof mass;
   a plurality of conductive springs, each of the springs being electrically connected to a corresponding one of the conductive leads; and
   a plurality of anchor pads connected to the substrate and one of the conductive springs.

2. The device of claim 1, further comprising one or more sense combs comprising first tines located on the proof mass and opposing second tines attached to the substrate.

3. The device of claim 2, further comprising damping combs comprising first tines located on the proof mass and opposing second tines attached to the substrate, the first damping comb tines being electrically isolated from the first sense comb tines.

4. The device of claim 1, wherein each of the conductive springs comprises:
   two first legs having a first cross-sectional dimension;
   an elbow; and
   two second legs having a second cross-sectional dimension,
   wherein the two second legs are connected between the elbow and one of the first legs and
   wherein the second cross-sectional dimension is smaller than the first cross-sectional dimension.

5. The device of claim 1, further comprising isolation trenches being directly connected to outer edges of the leads that are adjacent to other leads or proof mass material.

6. The device of claim 1, wherein the leads comprise a plurality of slots.

7. The device of claim 6, wherein the springs comprise a plurality of slots.

* * * * *